United States Patent
Zhu

(10) Patent No.: US 10,520,319 B2
(45) Date of Patent: Dec. 31, 2019

(54) DATA DRIVEN MAP UPDATING SYSTEM FOR AUTONOMOUS DRIVING VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 130 days.

(21) Appl. No.: 15/703,869

(22) Filed: Sep. 13, 2017

(65) Prior Publication Data

US 2019/0078896 A1   Mar. 14, 2019

(51) Int. Cl.
| | | |
|---|---|---|
| G01C 21/00 | (2006.01) | |
| G01C 21/32 | (2006.01) | |
| G07C 5/00 | (2006.01) | |
| G08G 1/00 | (2006.01) | |
| G06F 16/29 | (2019.01) | |

(52) U.S. Cl.
CPC ............. *G01C 21/32* (2013.01); *G06F 16/29* (2019.01); *G07C 5/00* (2013.01); *G08G 1/20* (2013.01)

(58) Field of Classification Search
USPC .................................................. 701/400–541
See application file for complete search history.

(56) References Cited

U.S. PATENT DOCUMENTS

| | | | | |
|---|---|---|---|---|
| 8,527,199 B1* | 9/2013 | Burnette | ................. | G01C 21/32 701/23 |
| 8,718,861 B1* | 5/2014 | Montemerlo | ......... | B60W 30/00 701/26 |
| 9,606,539 B1* | 3/2017 | Kentley | ................. | G01S 17/023 |
| 2014/0032108 A1* | 1/2014 | Zeng | ..................... | B60W 30/12 701/533 |
| 2014/0067187 A1* | 3/2014 | Ferguson | .............. | B60W 30/00 701/28 |
| 2016/0091325 A1* | 3/2016 | Takamatsu | ............ | B60W 30/12 701/408 |
| 2016/0169683 A1* | 6/2016 | Lynch | .................... | G01C 21/26 701/409 |
| 2016/0357262 A1* | 12/2016 | Ansari | ..................... | G06F 3/017 |
| 2017/0008521 A1* | 1/2017 | Braunstein | ............ | G01C 21/32 |
| 2017/0123421 A1* | 5/2017 | Kentley | .................. | G01S 17/87 |
| 2017/0124781 A1* | 5/2017 | Douillard | .............. | G01S 15/931 |
| 2018/0154899 A1* | 6/2018 | Tiwari | ................. | G08G 1/0112 |
| 2018/0348775 A1* | 12/2018 | Yu | ......................... | B60W 40/10 |
| 2019/0003839 A1* | 1/2019 | Hu | ......................... | G01C 21/32 |

\* cited by examiner

*Primary Examiner* — Jonathan L Sample
(74) *Attorney, Agent, or Firm* — Womble Bond Dickinson (US) LLP

(57) ABSTRACT

An analysis is performed on driving statistics of a variety of vehicles driven by a variety of drivers on a lane of a road section at different points in time. Based on the analysis of the driving statistics, a first drivable area of the lane of the road section is determined. The first drivable area is compared with a second drivable area associated with the lane of the road section to determine whether the first drivable area is different than the second drivable area. The second drivable area is determined based on map data of a map. In response to determining that the first drivable area is different than the second drivable area, the map is updated based on the difference of the first drivable area and the second drivable area. The updated map can be utilized subsequently to plan a path to drive an autonomous driving vehicle.

21 Claims, 10 Drawing Sheets

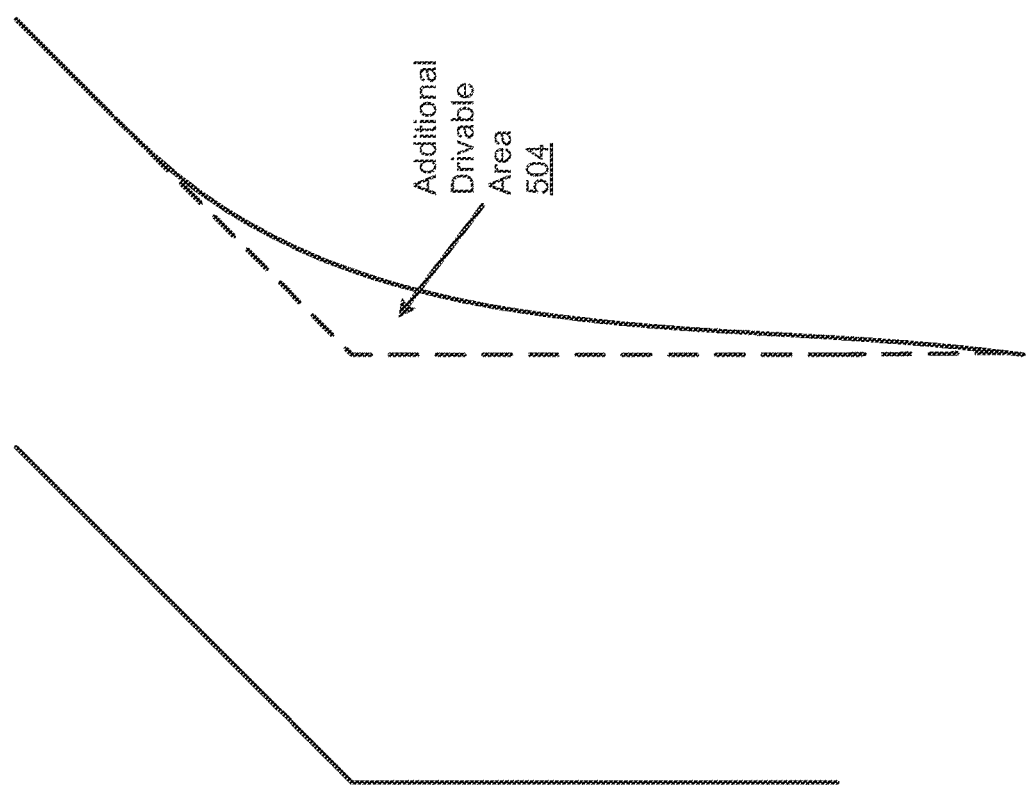

DATA DRIVEN MAP UPDATING SYSTEM FOR AUTONOMOUS DRIVING VEHICLES

TECHNICAL FIELD

Embodiments of the present disclosure relate generally to operating autonomous vehicles. More particularly, embodiments of the disclosure relate to updating maps for autonomous driving vehicles based on driving statistics.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

An autonomous driving vehicle is typically driven based on routes provided by a route and map service. The configuration of roads and lanes within a road is critical when planning a path to drive the autonomous driving vehicle. Thus, the accuracy of the map is very important. However, sometimes, a boundary of a road can be different from the one obtained from the map due to a variety of factors, such as, for example, map creation errors, damages to the road, or new construction of the road. Such a discrepancy of the roads from the map and the actual road condition may cause errors in planning and control an autonomous driving vehicle.

BRIEF DESCRIPTION OF THE DRAWINGS

Embodiments of the disclosure are illustrated by way of example and not limitation in the figures of the accompanying drawings in which like references indicate similar elements.

FIGS. 5A and 5B are diagrams illustrating a map updating process according to one embodiment.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a data driven map updating system is utilized to update road conditions of a map based on driving statistics collected from a variety of vehicles driven by a variety of drivers on a variety of roads and lanes. The driving statistics may include control commands (e.g., throttle, brake, steering commands) issued and responses of the vehicles (e.g., location, speed, acceleration, heading direction) captured at different points in time. For a given location of a lane, the actual driving paths of the vehicles are determined based on the captured driving statistics. A drivable area of the given location is determined based on physical parameters of the vehicles such as physical dimensions of the vehicles. The lane width and direction of the lane can be determined based on the drivable area of the given location. If the drivable area of the same location is different from the one indicated from the map, the map may be updated (e.g., with expanded or reduced drivable areas) based on the difference. The updated map can be utilized subsequently to drive autonomous driving vehicles.

According to one embodiment, an analysis is performed on driving statistics of a variety of vehicles driven by a variety of drivers on a lane of a road section at different points in time. Based on the analysis of the driving statistics, a first drivable area of the lane of the road section is determined. The first drivable area is compared with a second drivable area associated with the lane of the road section to determine whether the first drivable area is different than the second drivable area. The second drivable area is determined based on map data of a map. In response to determining that the first drivable area is different than the second drivable area, the map is updated based on the difference of the first drivable area and the second drivable area. The updated map can be utilized subsequently to plan a path to drive an autonomous driving vehicle (ADV).

Figure 1:
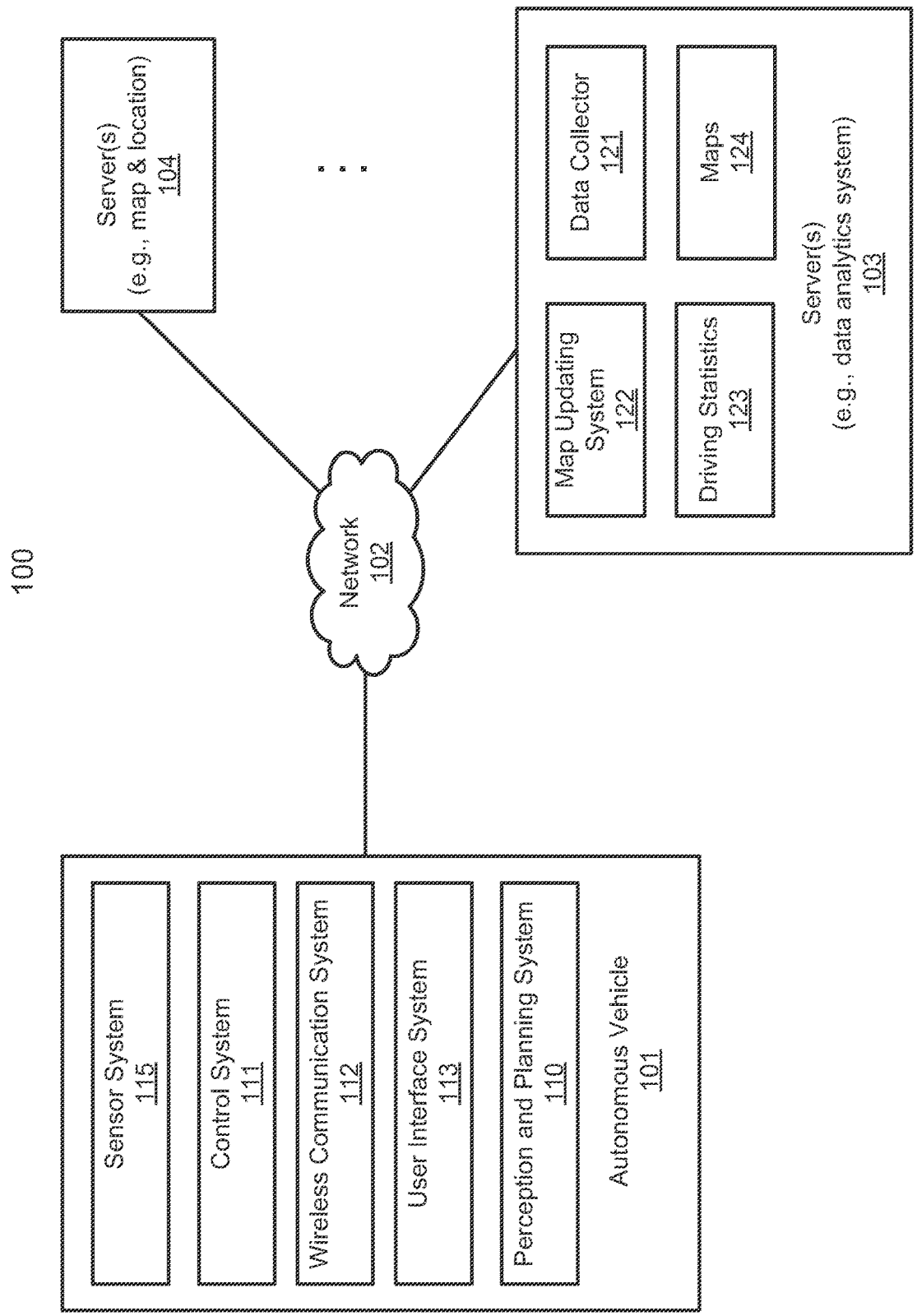
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
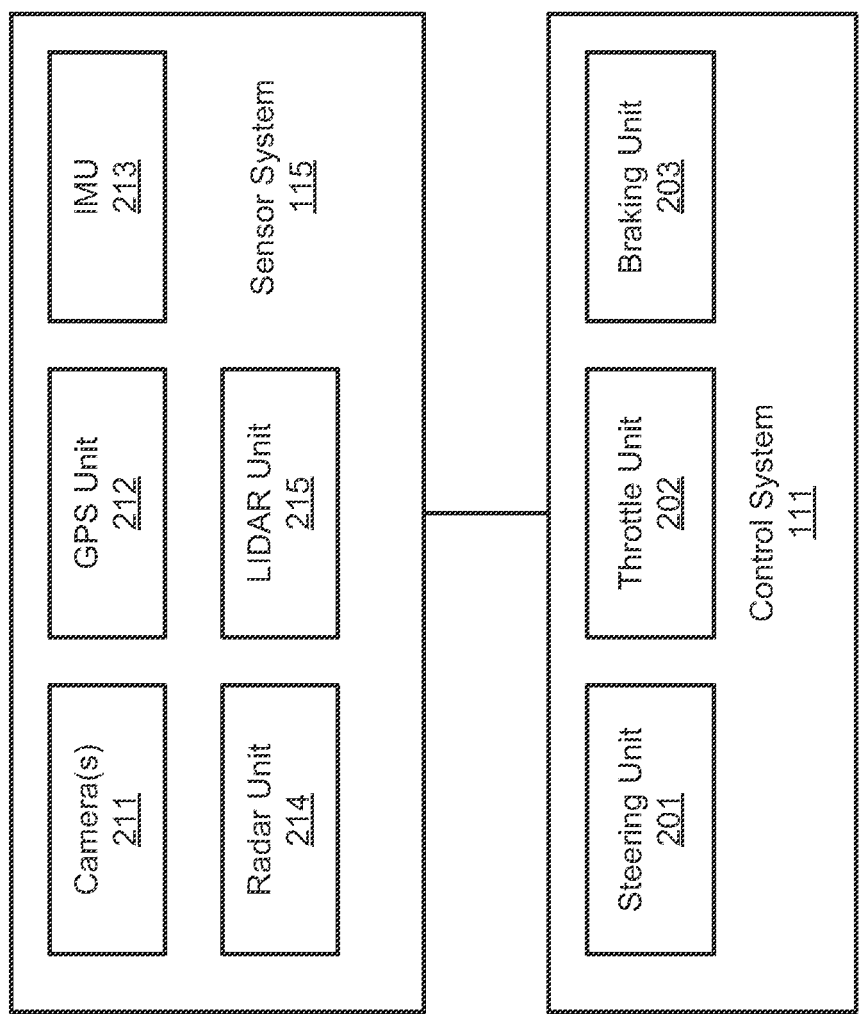
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and map update system or module 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., location, speeds, accelerations, decelerations, directions) captured by sensors of the vehicles at different points in time. Driving statistics 123 may further include information describing the driving environments at different points in time, such as, for example, routes (including starting and destination locations), MPOIs, road conditions (e.g., smooth, rough surface), weather conditions (e.g., wet, dry weather), etc.

According to one embodiment, map updating system 122 performs an analysis on driving statistics 123 to determine the actual drivable areas of certain locations of certain lanes based on the driving behaviors of many vehicles driving at the same locations. For a given location of a lane, map updating system 122 determines the driving paths of the vehicles. The map updating system 122 determines a driving area or a drivable area of the given location based on physical parameters of the vehicles such as physical dimensions of the vehicles. The map updating system 122 can determine a lane width and/or direction of the lane based on the drivable area of the given location. If the drivable area of the same location determined based on the driving statistics is different from the one indicated from the map, map updating system 122 may update the map (e.g., with expanded or reduced drivable areas of the same location or same lane) based on the difference. The updated map can be utilized subsequently to drive autonomous driving vehicles.

Figure 3A:
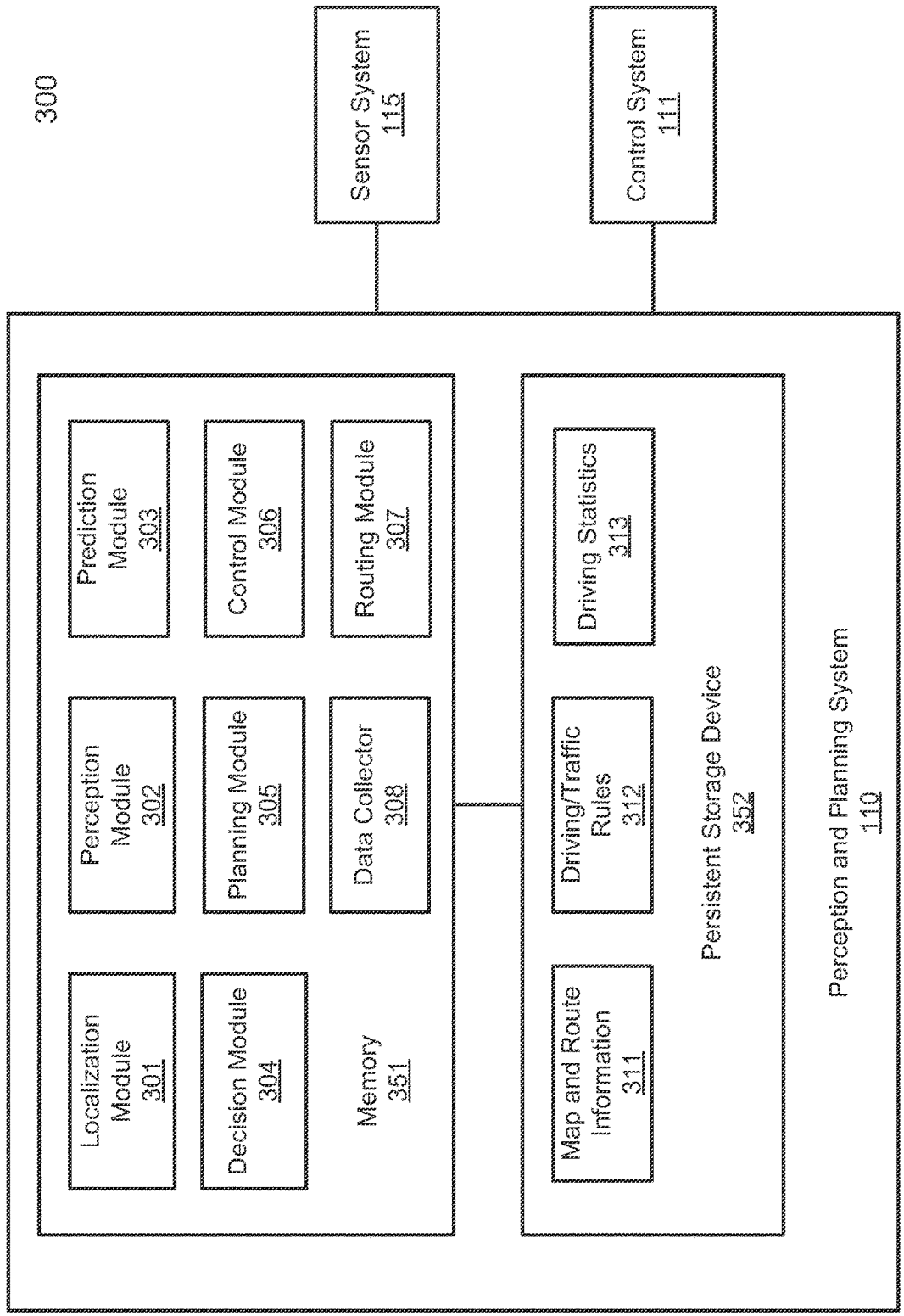
FIGS. 3A-3B are block diagrams illustrating an example of a perception and planning system used with an autonomous vehicle according to one embodiment.
Figure 3B:
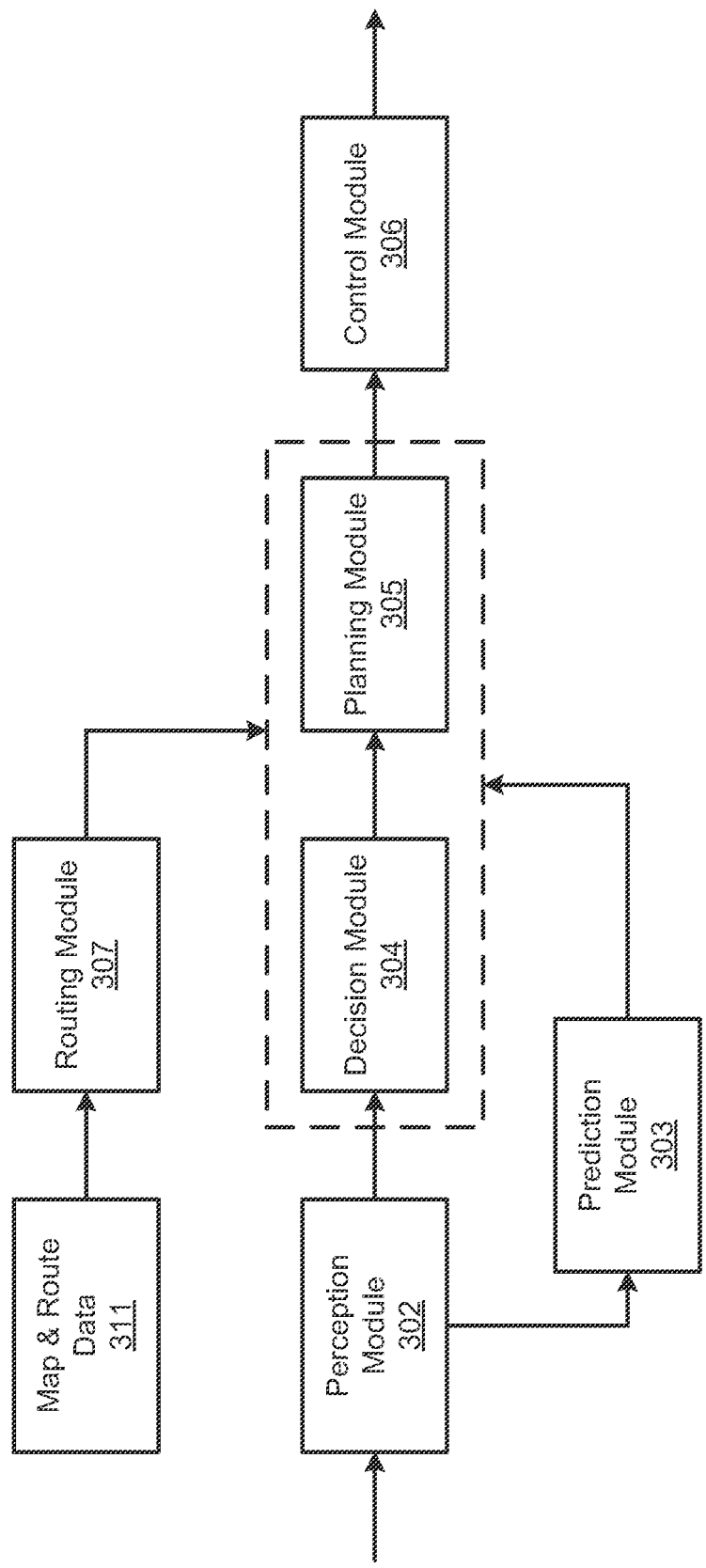

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and data collector 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

In one embodiment, map and route information 311 may include an updated map that has been updated from an original map based on driving statistics of a variety of vehicles. Specifically, a drivable area of a lane of the map may be modified and updated based on a drivable area of the same location of the lane determined based on the driving statistics. For example, based on the driving statistics, if there is an additional drivable area determined, the additional drivable area may be added to the map. Similarly, if an original drivable area of a lane becomes unavailable based on the driving statistics, the original drivable area may be reduced. The map updating process will be described in details further below.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a topographic map for each of the routes it determines from the starting location to reach the destination location. The topographic maps are then provided to decision module 304 and/or planning module 305. Decision module 304 and/or planning module 305 examines all of the possible routes to select one of the most optimal route in view of other data provided by other modules such as traffic conditions from localization module 301, driving environment perceived by perception module 302, and traffic condition predicted by prediction module 303.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Data collection module 308 is configured to communicate with other modules and sensors to collect driving statistics 313 during the operations of the ADV. Driving statistics 313 include information indicating the driving commands (e.g., throttle, brake, steering commands) issued and responses of the vehicle (e.g., location, speeds, accelerations, decelerations, directions) captured by sensors of the vehicle at different points in time. Driving statistics 313 may further include information describing the driving environments at different points in time, such as, for example, routes (including starting and destination locations), MPOIs, road conditions (e.g., smooth, rough surface), weather conditions (e.g., wet, dry weather), etc. Periodically, driving statistics 313 is then transmitted to a centralized server such as data analytics system 103 for data analysis and mining, for example, to develop scene/path data structures 124 offline using machine learning.

In one embodiment, system 300 may further include an optional map updating system (not shown) similar to map updating system 122 of FIG. 1. The map updating system performs an analysis on the driving statistics collected from a variety of vehicles (including the corresponding ADV associated with system 300) to determine the actual drivable areas of certain locations of certain lanes based on the driving behaviors of many vehicles driving at the same locations. In this embodiment, data collector 308 further communicates with a centralized server (e.g., server 103) to receive driving statistics of other vehicles. The centralized server is configured to centrally collect the driving statistics from all other vehicles involved in map updating operations.

For a given location of a lane, the map updating system determines the driving paths of the vehicles. The map updating system determines a driving area or a drivable area of the given location based on physical parameters of the vehicles such as physical dimensions of the vehicles. The map updating system can determine a lane width and direction of the lane based on the drivable area of the given location. If the drivable area of the same location determined based on the driving statistics is different from the one indicated from the map, the map updating system may update the map 311 (e.g., with expanded or reduced drivable areas of the same location or same lane) based on the difference.

Alternatively, the map updating system may transmit the determined drivable areas of different locations to the centralized server to allow the centralized server to determine the final drivable areas of the locations in view of the drivable areas of the same locations determined and received from other vehicles. The centralized server further updates the map and the updated map is then transmitted back to the individual vehicles. The updated map can be utilized subsequently to drive autonomous driving vehicles.

Figure 4:
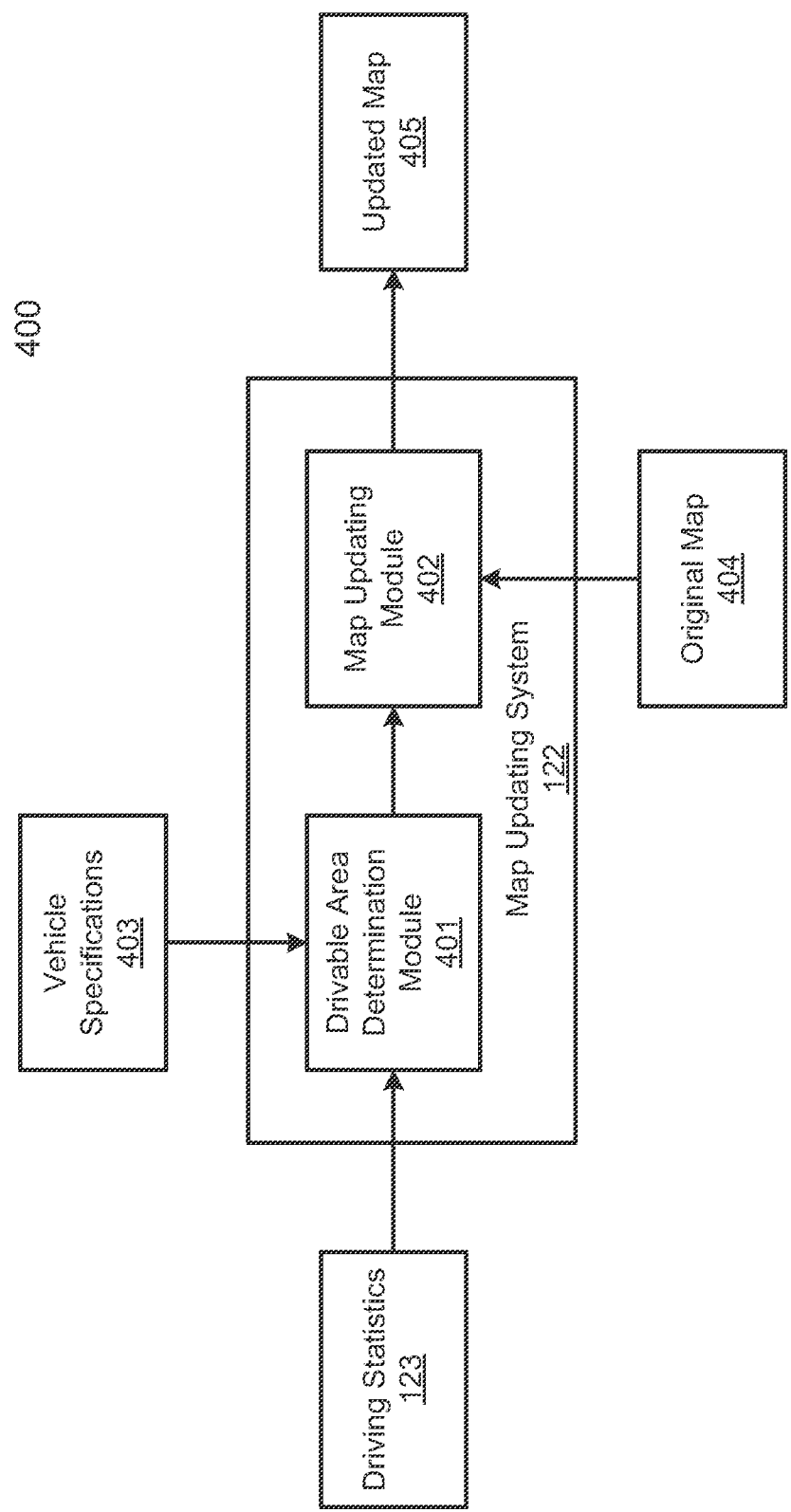
FIG. 4 is a processing flow diagram illustrating a processing flow of updating maps according to one embodiment.

FIG. 4 is a flow diagram illustrating a processing flow of updating maps based on driving statistics according to one embodiment. Processing flow 400 may be performed by a map updating system, either offline by a centralized data analytics system or online by an ADV. Referring to FIG. 4, according to one embodiment, map updating system 122 includes at least a drivable area detector or determination module 401 and map updating module 402. For each of selected locations of lanes or roads (e.g., the leftmost lane or the rightmost lane), drivable area determination module 401 analyzes the driving statistics 123 associated with that particular location to determine the driving behaviors of many drivers driving a variety of different vehicles. For each vehicle driving through the location, drivable area determination module 401 determines a size of the vehicle based on the specification of the corresponding type of the vehicles, which may be obtained as a part of vehicle specifications 403. Based on the size of the vehicle, drivable area determination module 401 calculates the drivable area of that particular type of vehicles for that particular location.

In one embodiment, drivable area determination module 401 draws a boundary box surrounding the vehicle based on the specification of the vehicle, which may be obtained as a part of vehicle specification 403. That boundary box represents a drivable area or drivable width that allows the vehicle to drive through. The boundary box may be drawn using the location of the vehicle as a center point of the boundary box. The location of the vehicle may be obtained based on GPS data of the vehicle.

Figure 5A:
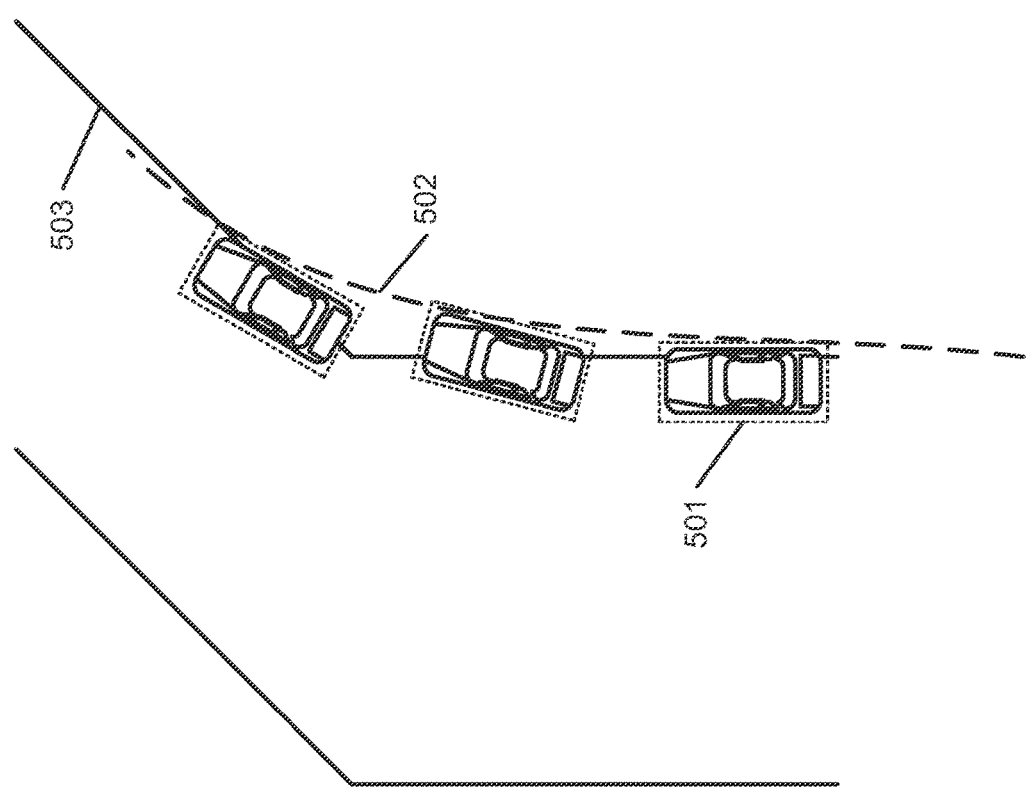

For example, referring now to FIG. 5A, when a vehicle moves along a lane, in this example, the rightmost lane. Based on the driving statistics of the vehicle, a boundary box 501 is determined based on the vehicle specification (e.g., physical dimension) plus a predetermined margin or tolerance area. The boundary box 501 is drawn using the location of the vehicle as a center point, where the location of the vehicle can be determined based on the GPS and/or IMU data of the vehicle provided by GPS and IMY sensors. The moving path 502 of the boundary box 501 can be utilized to determine a drivable area for the vehicle along the lane. In this example, the right edge of the boundary box is utilized to determine the right edge of a drivable area for the vehicle at that specific location. A sequence of such boundary boxes can be used to derive a drivable path 502 for that specific type of vehicles. If the drivable path 502 is outside and beyond the original lane 503 obtained from the map, the area between the drivable path and the original lane can be considered as an additional drivable area 504 as shown in FIG. 5B.

Note that it could be an accident for a vehicle driving outside of the lane, which cannot be considered as an additional drivable area to the lane. However, if there are many vehicles of different types driving in a similar pattern, it is highly likely that the additional drivable area determined from these vehicles' driving behaviors is a part of the lane. This may be due to the new constructions or repairs on the road that have not been reflected in the map. In one embodiment, if there are more than a predetermined number of vehicles driving through the same location outside of a particular lane, the final additional drivable area of the lane can be determined by taking an average of the drivable area determined based on the individual vehicle's driving statistics and vehicle specification.

Figure 6B:
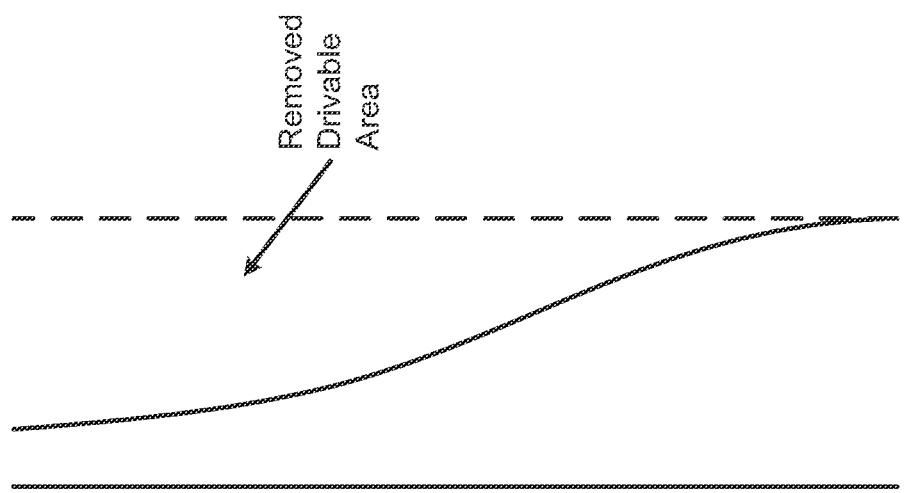
FIGS. 6A and 6B are diagrams illustrating a map updating process according to another embodiment.
Figure 6A:
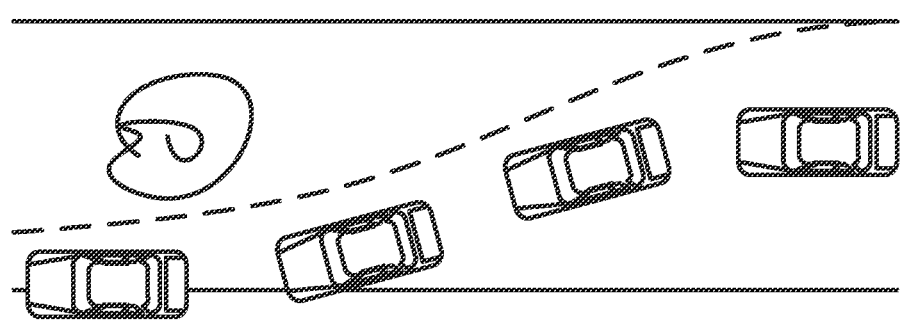

Similarly, the above process can be utilized to identify a drivable area of a lane that is unavailable based on the driving statistics of the vehicles driving through the same area, even if the original map 404 indicates that such a drivable area is available. For example, there could be damage such as a pot hole in the middle of a lane or a landslide causing some drivable areas unavailable. Based on driving statistics 123, it is determined that most of the vehicles have to go around that particular area as shown in FIG. 6A. In response, drivable area determination module 401 determines that the area becomes unavailable as shown in FIG. 6B.

Once the drivable area of the lane has been determined based on the driving statistics of a large number of vehicles, map updating module 402 can update original map 404 if there is any difference between the drivable area determined based on the driving statistics 123 and the drivable area obtained from original map 404. For example, map updating module 402 can expand a drivable area of a lane indicated by original map 404 if the driving statistics 123 indicate there is an additional drivable area to the lane. Alternatively, map updating module 402 can reduce a drivable area of a lane based on the driving statistics 123 if the driving statistics 123 indicate that a certain portion of the drivable area of the lane is unavailable, even though original map 404 states it is available otherwise. Updated map 405 is then generated by map updating module 402 and the updated map 405 can be then be uploaded onto the ADVs for real-time driving. Note that although the above map updating process is performed by a data analytics system such as data analytics system 103, however, the same process can also performed within a vehicle at real time.

Figure 7:
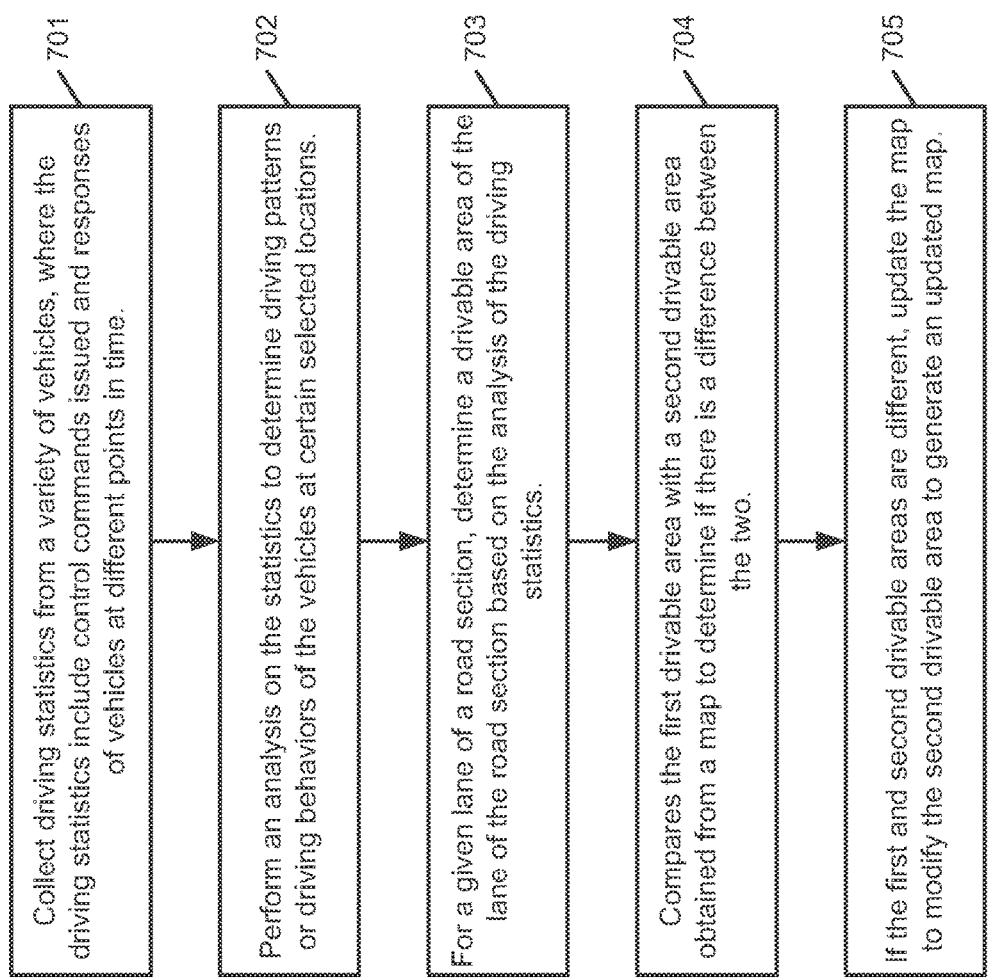
FIG. 7 is a flow diagram illustrating an example of a map updating process according to one embodiment.

FIG. 7 is a flow diagram illustrating a process of updating maps according to one embodiment. Process 700 may be performed by processing logic which may include software, hardware, or a combination thereof. For example, process 700 may be performed by map updating system 122 of FIG. 1. Referring to FIG. 7, in operation 701, processing logic collects driving statistics from a variety of vehicles, where the driving statistics include control commands issued and responses of the vehicles in response to the control commands on a variety of lanes and roads at different points in time. In operation 702, processing logic performs an analysis on the driving statistics to determine the driving patterns or behaviors of the vehicles at certain locations. In operation 703, for a given lane of a road section, processing logic determines a first drivable area of the lane of the road section base on the analysis of the driving statistics. In operation 704, processing logic compares the first drivable area with a second drivable area associated with the lane of the road section to determine whether the first drivable area is different than the second drivable area (e.g., outside of the lane). The second drivable area is determined based on map data of a map concerning the lane of the road section. In response to determining that the first and second drivable areas are different, in operation 705, processing logic updates the map based on the difference between the first and second drivable areas (e.g., modifying the second drivable area on the map). The updated map can then be utilized to drive the autonomous driving vehicles subsequently.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
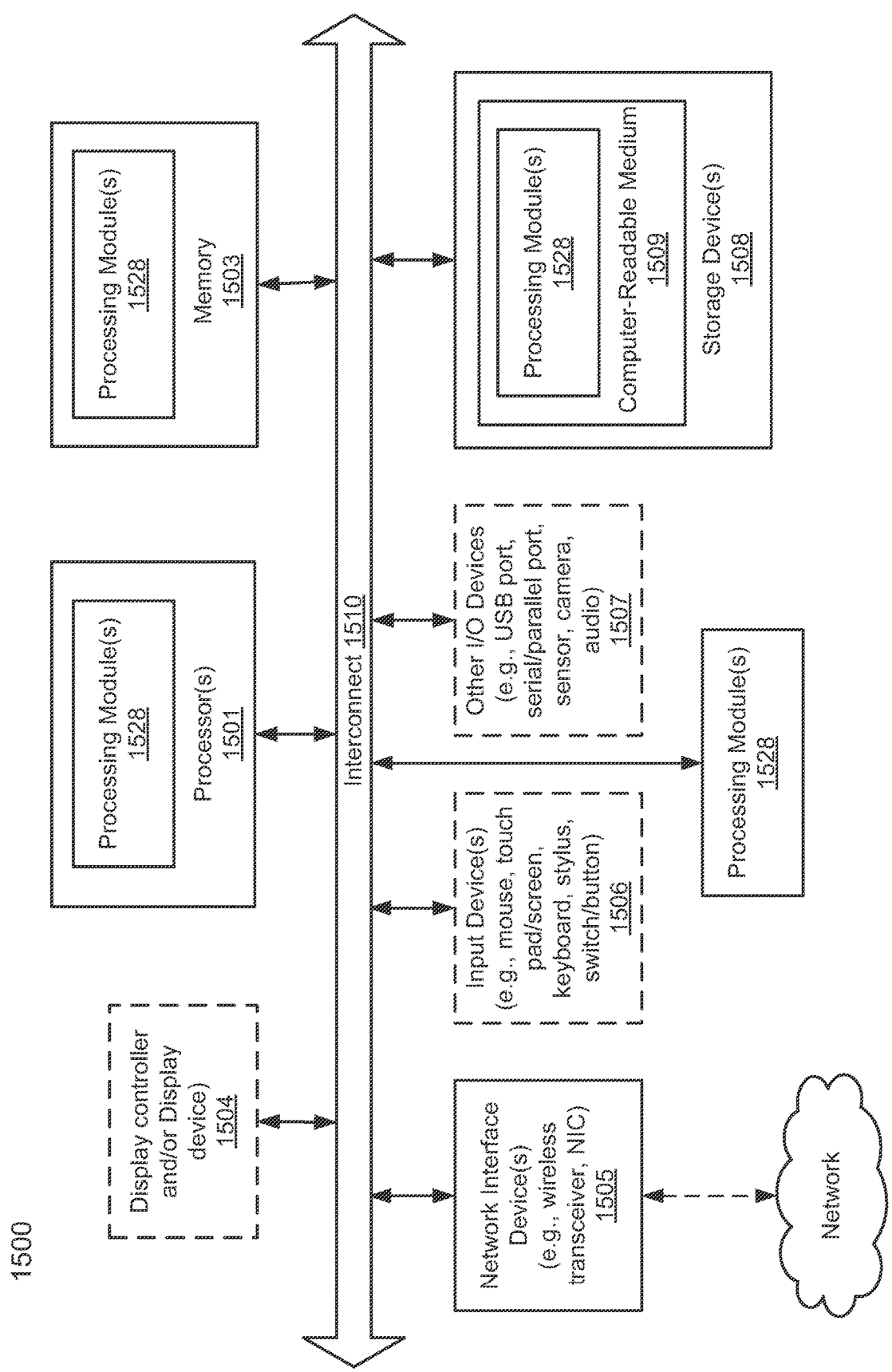
FIG. 8 is a block diagram illustrating a data processing system according to one embodiment.

FIG. 8 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, map updating system 122. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for updating maps for autonomous driving vehicles, the method comprising:
    performing an analysis on driving statistics of a plurality of vehicles, wherein the driving statistics were collected from the plurality of vehicles driving on a lane of a road section;
    determining a first drivable area of the lane of the road section based on the analysis of the driving statistics, including calculating a boundary box surrounding each of a plurality of vehicles driving through the lane based on a physical dimension of the vehicle, and calculating an individual drivable area for the vehicle based on a moving curve of the boundary box;
    comparing the first drivable area with a second drivable area associated with the lane of the road section to determine whether the first drivable area is different than the second drivable area obtained from a map, wherein the second drivable area is determined based on map data of the map; and
    in response to determining that the first drivable area is different than the second drivable area, updating the map based on a difference between the first drivable area and the second drivable area, wherein the updated map is utilized subsequently to plan a path on within the lane of the road section to drive an autonomous driving vehicle (ADV).

2. The method of claim 1, wherein the driving statistics comprise control commands issued and responses of the vehicles in response to the control commands on a plurality of lanes and roads at different points in time.

3. The method of claim 1,
    wherein the first drivable area for the lane is determined based on individual drivable areas of the plurality of vehicles.

4. The method of claim 3, wherein the first drivable area is determined based on an average of individual drivable areas of the plurality of vehicles.

5. The method of claim 3, wherein the first drivable area of the lane is determined based on individual drivable areas of a number of vehicles greater than a predetermined threshold.

6. The method of claim 1, wherein updating the map based on the difference between the first drivable area and the second drivable area comprises expanding the second drivable area of the lane based on the first drivable area if the first drivable area includes an area that is outside of the second drivable area.

7. The method of claim 1, wherein updating the map based on the difference between the first drivable area and the second drivable area comprises reducing the second drivable area of the lane based on the first drivable area if the first drivable area is smaller than the second drivable area.

8. A non-transitory machine-readable medium having instructions stored therein, which when executed by a processor, cause the processor to perform operations, the operations comprising:
    performing an analysis on driving statistics of a plurality of vehicles, wherein the driving statistics were collected from the plurality of vehicles driving on a lane of a road section;
    determining a first drivable area of the lane of the road section based on the analysis of the driving statistics, including calculating a boundary box surrounding each of a plurality of vehicles driving through the lane based on a physical dimension of the vehicle, and calculating an individual drivable area for the vehicle based on a moving curve of the boundary box;
    comparing the first drivable area with a second drivable area associated with the lane of the road section to determine whether the first drivable area is different than the second drivable area obtained from a map, wherein the second drivable area is determined based on map data of the map; and
    in response to determining that the first drivable area is different than the second drivable area, updating the map based on a difference between the first drivable area and the second drivable area, wherein the updated map is utilized subsequently to plan a path on within the lane of the road section to drive an autonomous driving vehicle (ADV).

9. The machine-readable medium of claim 8, wherein the driving statistics comprise control commands issued and responses of the vehicles in response to the control commands on a plurality of lanes and roads at different points in time.

10. The machine-readable medium of claim 8,
    wherein the first drivable area for the lane is determined based on individual drivable areas of the plurality of vehicles.

11. The machine-readable medium of claim 10, wherein the first drivable area is determined based on an average of individual drivable areas of the plurality of vehicles.

12. The machine-readable medium of claim 10, wherein the first drivable area of the lane is determined based on individual drivable areas of a number of vehicles greater than a predetermined threshold.

13. The machine-readable medium of claim 8, wherein updating the map based on the difference between the first drivable area and the second drivable area comprises expanding the second drivable area of the lane based on the first drivable area if the first drivable area includes an area that is outside of the second drivable area.

14. The machine-readable medium of claim 8, wherein updating the map based on the difference between the first drivable area and the second drivable area comprises reducing the second drivable area of the lane based on the first drivable area if the first drivable area is smaller than the second drivable area.

15. A data processing system, comprising:
    a processor; and
    a memory coupled to the processor to store instructions, which when executed by the processor, cause the processor to perform operations, the operations including
        performing an analysis on driving statistics of a plurality of vehicles, wherein the driving statistics were collected from the plurality of vehicles driving on a lane of a road section, determining a first drivable area of the lane of the road section based on the analysis of the driving statistics, including calculating a boundary box surrounding each of a plurality of vehicles driving through the lane based on a physical dimension of the vehicle, and calculating an individual drivable area for the vehicle based on a moving curve of the boundary box, comparing the first drivable area with a second drivable area associated with the lane of the road section to determine whether the first drivable area is different than the second drivable area obtained from a map, wherein the second drivable area is determined based on map data of the map, and in response to determining that the first drivable area is different than the second drivable area, updating the map based on a difference between the first drivable area and the second drivable area, wherein the updated map is utilized subsequently to plan a path on within the lane of the road section to drive an autonomous driving vehicle (ADV).

16. The system of claim 15, wherein the driving statistics comprise control commands issued and responses of the vehicles in response to the control commands on a plurality of lanes and roads at different points in time.

17. The system of claim 15, wherein the first drivable area for the lane is determined based on individual drivable areas of the plurality of vehicles.

18. The system of claim 17, wherein the first drivable area is determined based on an average of individual drivable areas of the plurality of vehicles.

19. The system of claim 17, wherein the first drivable area of the lane is determined based on individual drivable areas of a number of vehicles greater than a predetermined threshold.

20. The system of claim 15, wherein updating the map based on the difference between the first drivable area and the second drivable area comprises expanding the second drivable area of the lane based on the first drivable area if the first drivable area includes an area that is outside of the second drivable area.

21. The system of claim 15, wherein updating the map based on the difference between the first drivable area and the second drivable area comprises reducing the second drivable area of the lane based on the first drivable area if the first drivable area is smaller than the second drivable area.

* * * * *